(12) United States Patent
Ramacher et al.

(10) Patent No.: US 6,336,514 B1
(45) Date of Patent: Jan. 8, 2002

(54) WHEEL SUSPENSION FOR MOTOR VEHICLES, ESPECIALLY UTILITY VEHICLES

(75) Inventors: Klaus Ramacher, Stolberg; Volker Rosenkranz, Potsdam, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/381,333
(22) PCT Filed: Feb. 27, 1998
(86) PCT No.: PCT/EP98/01115
 § 371 Date: Jun. 28, 2000
 § 102(e) Date: Jun. 28, 2000
(87) PCT Pub. No.: WO98/41437
 PCT Pub. Date: Sep. 24, 1998

(30) Foreign Application Priority Data

Mar. 19, 1997 (DE) .......................................... 197 11 381

(51) Int. Cl.[7] .............................................. B62D 61/00
(52) U.S. Cl. .................. 180/21; 180/402; 180/444; 180/443; 280/761; 280/92
(58) Field of Search ...................... 180/287.71, 93.513, 180/402, 443, 444; 74/402, 443, 444; 280/92, 93.505, 761

(56) References Cited

U.S. PATENT DOCUMENTS

| 1,125,184 | A | * | 1/1915 | Schleicher |
| 4,003,447 | A | * | 1/1977 | Weyer ......................... 180/140 |
| 4,895,216 | A |   | 1/1990 | Fusimi et al. |
| 5,379,842 | A | * | 1/1995 | Terry ........................... 180/21 |
| 5,419,580 | A | * | 5/1995 | Ku .............................. 280/761 |
| 5,535,843 | A | * | 7/1996 | Takeda et al. .............. 180/200 |
| 5,624,004 | A | * | 4/1997 | Watanabe ................... 180/168 |

FOREIGN PATENT DOCUMENTS

| DE | 4028738 C1 | 12/1991 |
| JP | 60-135323 | 7/1985 |
| JP | 4-317865 | 11/1992 |
| JP | 9-2300 | 1/1997 |

OTHER PUBLICATIONS

Patent Abstracts of Japan, Japanese Pub. No. 60–135323, Jul. 18, 1985, vol. 009, No. 297 (M–432), Nov. 25, 1985.

* cited by examiner

Primary Examiner—Lanna Mai
Assistant Examiner—Paul Royal, Jr.
(74) Attorney, Agent, or Firm—Crowell & Moring, LLP

(57) ABSTRACT

For a wheel suspension for vehicles, in particular commercial vehicles with a wheel unit that can be rotated about an upright axis of rotation, the proposal is to design the wheel unit with its actuating and drive structure as an assembly that is situated outside the vehicle body and can be removed to the outside.

20 Claims, 4 Drawing Sheets

WHEEL SUSPENSION FOR MOTOR VEHICLES, ESPECIALLY UTILITY VEHICLES

BACKGROUND AND SUMMARY OF THE INVENTION

The present invention relates to a wheel suspension for vehicles, in particular commercial vehicles.

Wheel suspensions of the type mentioned above are known from U.S. Pat. No. 5,379,842. In these wheel suspensions, the floor section of the vehicle has attached to it a mounting head which carries a bracket in a manner that allows the latter to be rotated about an upright axis. The bracket is supported relative to the ground by wheels. The bracket is designed to be intrinsically vertically adjustable to ensure uniform load distribution during use on uneven terrain and when a plurality of such wheel suspensions are used as supporting units, for heavy loads for example. The mounting head carries a ring gear and the bracket, for its part, is connected, at the circumference of its top part which is supported relative to the mounting head and is not vertically adjustable, to an actuating motor which has an upright axis of rotation and engages in the ring gear by way of its drive pinion, which is provided at the upper end.

Owing to the forces acting on the wheel suspension, the central mounting for the bracket is subject to considerable loads and it is virtually impossible to keep the bracket free from play due both to assembly and to wear. A corresponding play in the mounting in conjunction with other tolerances, for example in the centering of the ring gear relative to the bearing axis, in the gearing and in the fixing of the actuating motor relative to the bracket, means that it is virtually impossible to make the pinion/ring gear pair backlash-free in operation, and play-free steering can be achieved and maintained only with difficulty.

JP-A-60 135323 has furthermore disclosed a pivoted-wheel arrangement for a truck. In the arrangement, there is a guide ring which is fixed relative to the vehicle, on the floor, determines the pivoting axis of the vehicle and is coaxial with the axis, and to which is assigned, in a coaxially torsionally rigid manner, an internally toothed ring gear and a supporting ring. The supporting ring is offset axially towards the wheel in relation to the ring gear, is rotatable, and carries the wheel with an axis of rotation perpendicular to the upright pivoting axis, an associated wheel hub motor and an upright actuating motor. The drive pinion of the latter meshes with the ring gear, allowing the rotational position of the wheel to be adjusted by the actuating motor. A design of this kind allows a relatively large diameter for the support of the supporting ring relative to the guide ring and hence comparatively low specific loads. Even with a design of this kind, however, unavoidable tolerances, load-related compliance and wear make permanently backlash-free meshing virtually impossible, with the result that play-free steering can be achieved and maintained only with difficulty.

The invention is intended to develop a wheel suspension of the type stated at the outset in such a way that, without complicating its structure, a largely play-free driving connection can be achieved between the actuating motor and the ring gear as a prerequisite for a steering system that is, as far as possible, without play.

This is achieved by a basic approach from which the invention starts, which is to use the ring gear with which the pinion of the actuating motor is to be kept in engagement as a fixed support for the actuating motor, i.e. to provide, between the ring gear and the pinion, a support which allows a largely play-free connection between the pinion and the ring gear, irrespective of any other component tolerances and instances of play due to wear and loads, in conjunction with elastic support of the actuating motor relative to the bracket.

With a view to providing as compact a construction as possible, it has proven expedient for the supporting ring to be internally toothed and for the actuating motor to receive counter support against the outer circumference of the supporting ring.

The structural complexity can be kept relatively low while ensuring a small overall volume if the actuating motor is arranged vertically on the bracket, carries the drive pinion in the upper end region and is connected to the bracket by struts that are at an angle to one another and, with the bracket as the base, form a supporting triangle in plan view. Such a solution makes it possible to keep the ring gear and the pinion in mesh virtually without play even if the actuating motor is connected to the bracket and the bracket, for its part, undergoes certain deviations from the position in which it is concentric with the supporting ring due to play and/or loads.

BRIEF DESCRIPTION OF THE DRAWINGS

The invention is explained in greater detail below with reference to an embodiment example illustrated in the drawings, in which the figures are each highly schematized

DESCRIPTION OF THE PREFERRED EMBODIMENT

Figure 1:
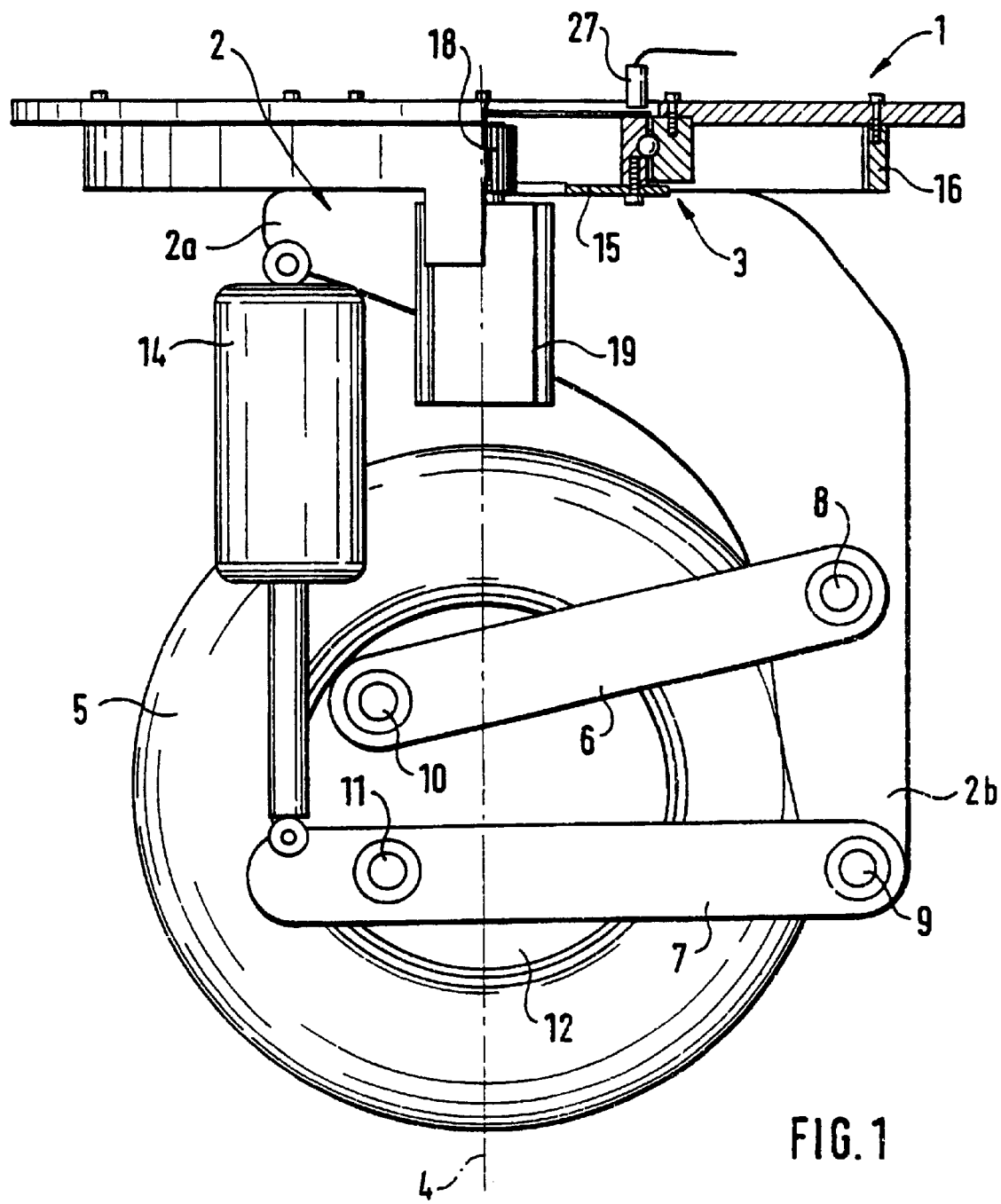
FIG. 1 shows a side view of one configuration of a wheel suspension according to the invention.

For the explanatory description of the invention with reference to the figures, it is first of all assumed that the wheel suspension according to the invention is an assembly made up of the parts shown in FIG. 1.

Figure 2:
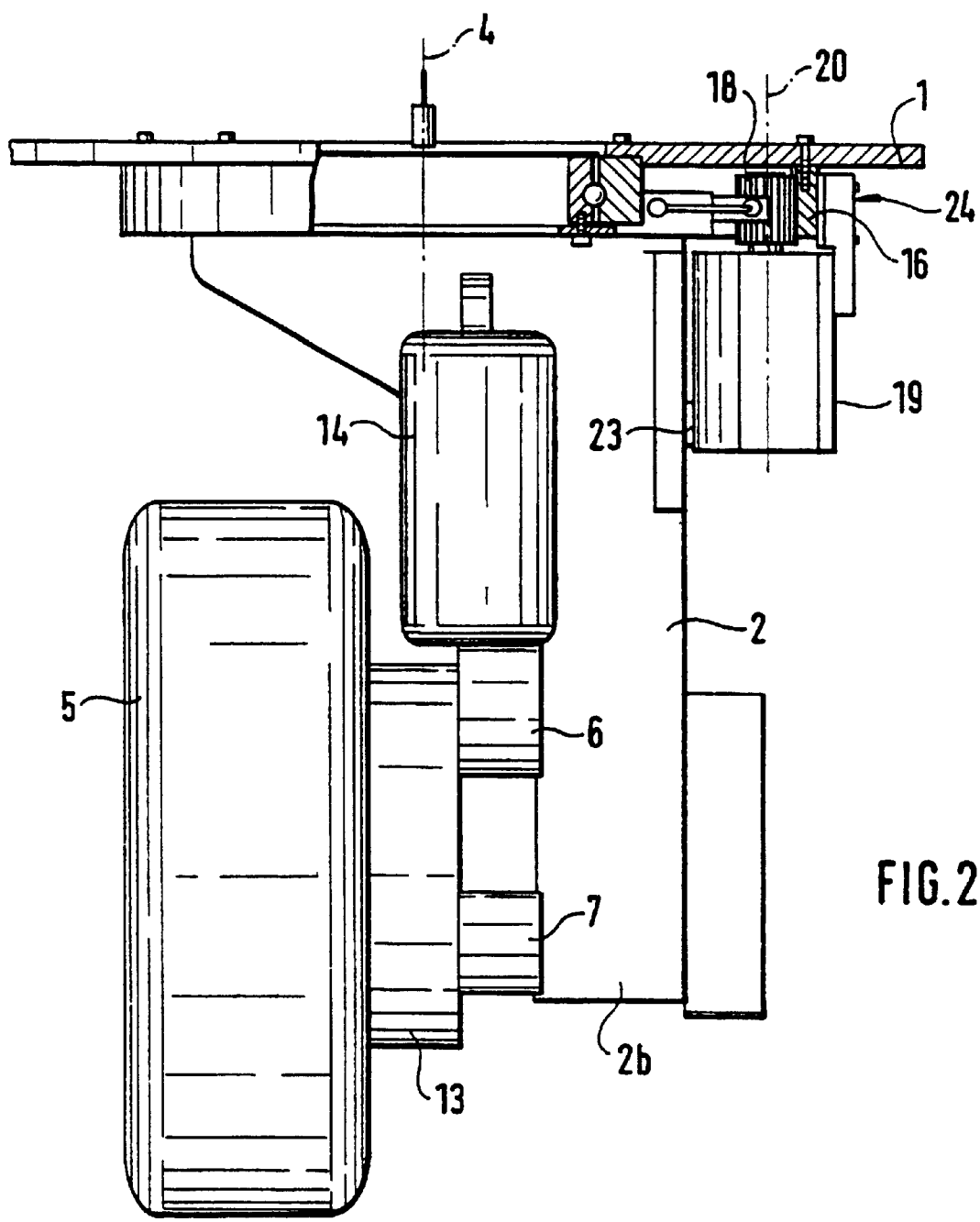
FIG. 2 shows a front view of the wheel suspension shown in FIG. 1.

The form shown in FIG. 1 comprises a plate-shaped mounting head 1, which can be assigned a corresponding fixing flange on the vehicle body (not shown specifically) in a manner not shown specifically, against which fixing flange the plate-shaped mounting head can be bolted (in a manner not shown specifically) or fixed in some other way. The other parts of the wheel suspension, in particular, for example, the bracket 2, which is connected via the bearing 3 to the mounting head 1, are attached to the mounting head 1. In FIG. 1, the bearing 3 is shown in section. The bearing 3 with its center line 4, which is upright and preferably vertical to the plane of the ground, allows the bracket 2 to pivot relative to the mounting head 1, preferably through at least 110° in both directions relative to the straight-ahead position of the wheel 5, allowing both a transverse motion and the implementation of other steering programs that may be necessary in practice. In principle, however, the solution according to the invention also allows rotation of the wheel through 360° relative to the axis 4, given appropriate configuration (not shown specifically here). The bracket 2, which is of L-shaped design and is connected by way of its horizontal limb 2a to the bearing 3, furthermore has a vertically extending limb 2b that extends downwards from limb 2a and to which are attached the wheel location members, which are formed by two links 6 and 7. Of the links 6 and 7, which are pivoted to link 2b by bearings 8 and 9 respectively and extend essentially parallel to the longitudinal center plane of the wheel 5 but to the side of the latter, link 6 forms an upper link, which extends downwards from bearing 8 at a relatively shallow angle, while link 7 forms a lower link and extends virtually horizontally. From the bearings 8 and 9 and therefore as seen from limb 2b, links 6 and 7 extend in the direction of limb 2a. At the wheel end, links 6 and 7 are connected by way of bearings 10 and 11 to the carrier 12 of the wheel hub motor 13 (not shown specifically), which is partially surrounded by the wheel 5. The wheel suspension and/or shock absorber strut 14, which is indicated schematically and the upper attachment point of which is assigned to that end of limb 2a which is remote from limb 2b, is supported at the free end of link 7, the end adjacent to the wheel, on the other side of bearing 11 from bearing 9. In relation to the bracket 2, links 6 and 7 preferably lie between the wheel 5 and the bracket 2, as FIG. 2 shows. That is, the position of the wheel 5 is offset laterally relative to limb 2b of the bracket 2, the offset of the wheel 5 relative to limb 2b corresponding approximately to twice the lateral offset of the bearing axis 4 relative to limbs 2a and 2b. Limb 2a is provided with a lateral projection, more specifically in the direction of the lateral offset of the wheel 5, and bearing 3 is supported on this projection. In the illustrated embodiment, support is by way of a bearing plate 15 which is connected to the inner race 3a of bearing 3, which has an outer race 3b that, for its part, is screwed to the plate-shaped mounting head 1.

Figure 3:
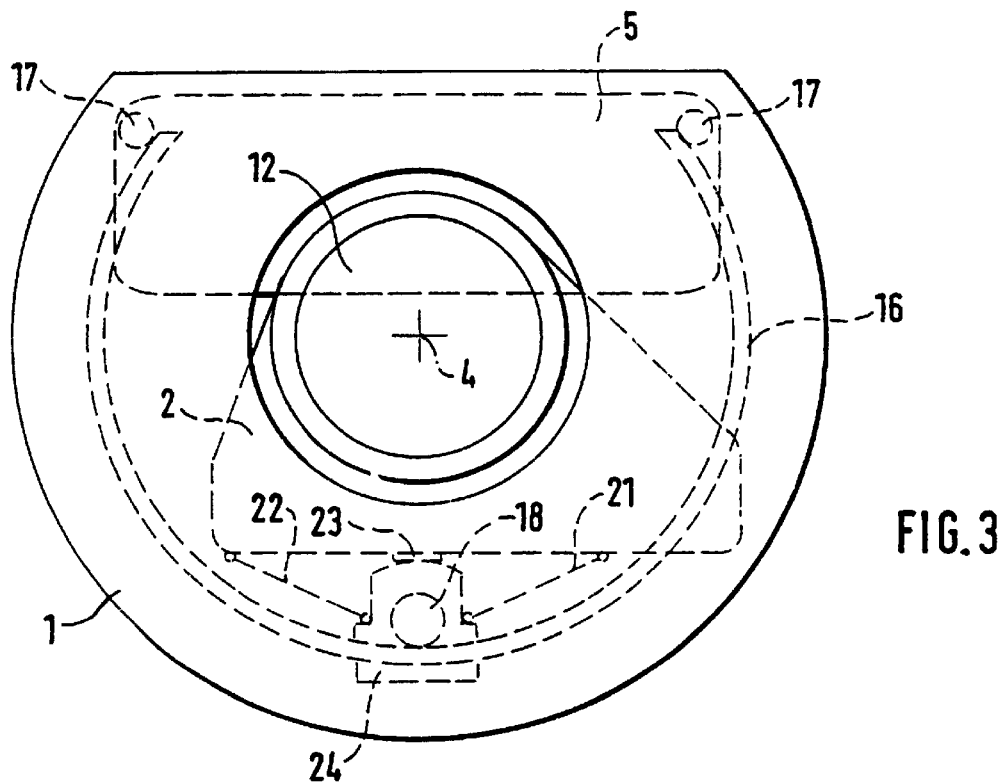
FIG. 3 shows a plan view of the wheel suspension shown in FIGS. 1 and 2, substantially without the mounting head.

Concentrically to bearing 3, the plate-shaped mounting head 1 furthermore carries a supporting ring 16, which has a larger radius relative to the axis 4 and, as FIG. 3 shows, is not complete in view of the incomplete rotatability of the wheel envisaged here and the open ends of which end in the region of the outer edge of the wheel 5. In relation to the straight-ahead position of the wheel, the ends are assigned stops 17 which limit the pivoting travel of the bracket.

Figure 4:
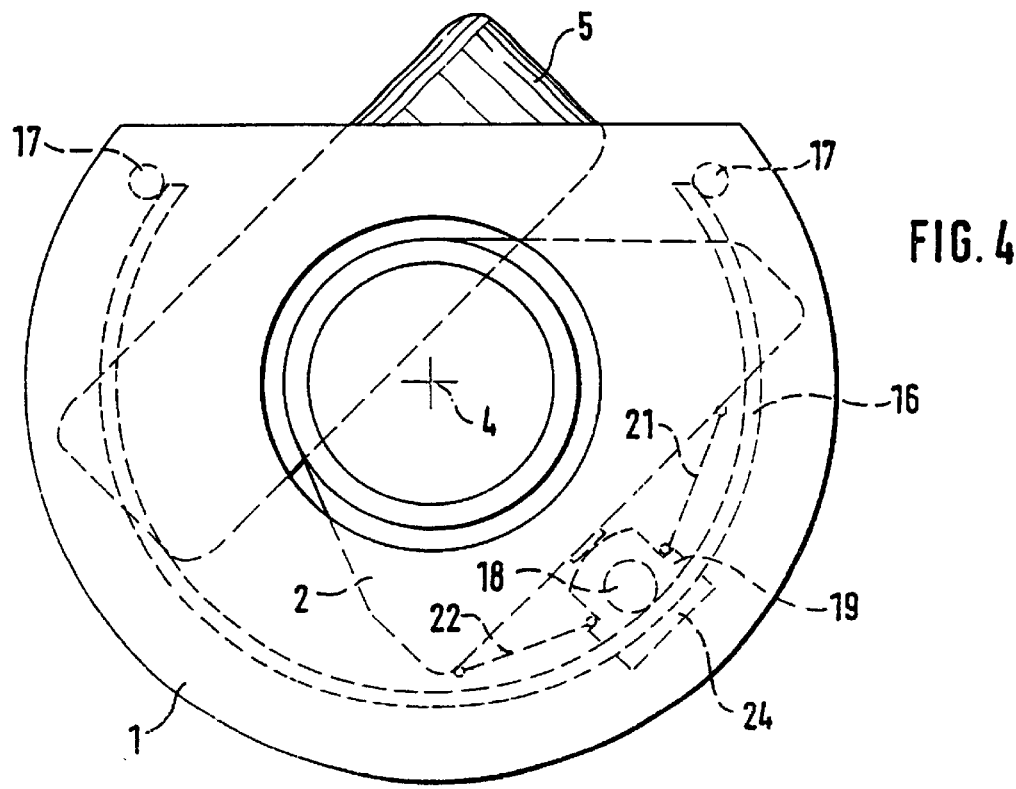
FIG. 4 shows an illustration corresponding to FIG. 3 with the wheel turned by 45° relative to the straight-ahead position shown in FIG. 3.

As a fixed support, the supporting ring 16 in the illustrated embodiment is designed as an internally toothed ring and interacts with a pinion 18 of a drive motor 19 that forms an actuating means and is mounted on the bracket close to limb 2a with the axis 20 of rotation upright. As shown, in particular, in FIGS. 3 and 4, in the illustrated embodiment it is attached by supporting struts 21, 22, which extend in the longitudinal direction of limb 2a and are preferably connected in an elastically hinged manner both to the motor 19 and to the bracket 2. In the plan view of FIG. 3, they form—roughly speaking—the sides of an isosceles triangle, the vertex of which is located on the other side of limb 2a from the axis 4 and laterally offset relative to said limb and the base of which is formed by limb 2a. To provide further support for the motor 19 in the region of its lower end, the end remote from the pinion 18, the motor is given an elastic support 23 relative to the bracket 2. This type of attachment for the motor 19 ensures that the pinion 18 can be held in engagement with the supporting ring 16 irrespective of tolerances and wear. Another factor contributing to this is that there is an outer support 24, fixed relative to the motor 19, that fits over the supporting ring 16, in particular essentially opposite the pinion 18. This outer support expediently is provided with a sliding plate 25 that acts on the supporting ring 16 and, for its part, is supported by a spring 26 or the like relative to that part of the outer support 24 which is fixed in relation to the motor.

Figure 5:
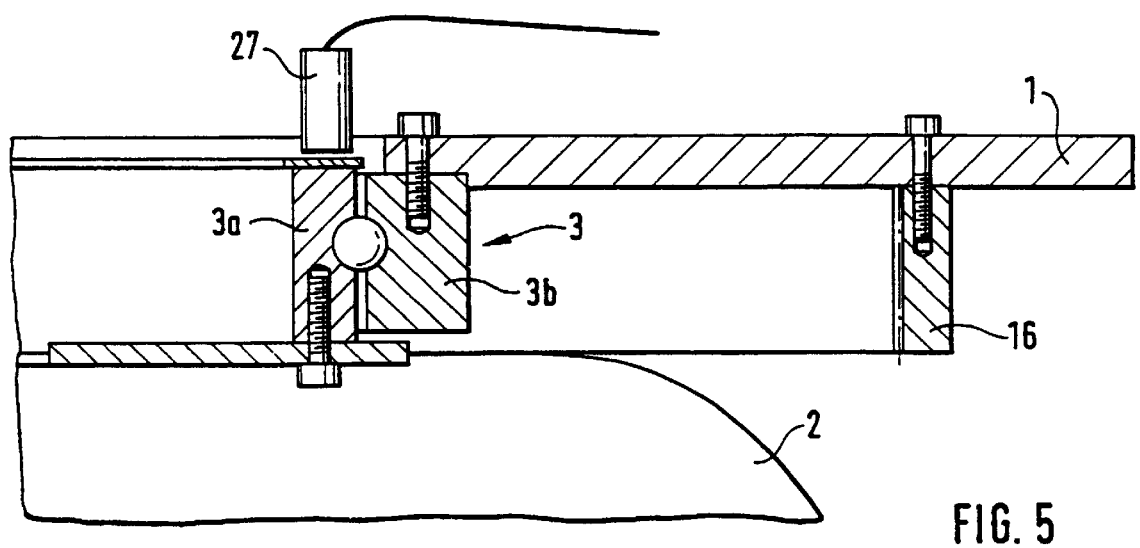
FIG. 5 shows a partial view of the mounting head on an enlarged scales and FIG. 6 shows an enlarged partial view of the connection of the drive to the mounting head in a representation corresponding to that in FIG. 5.
Figure 6:
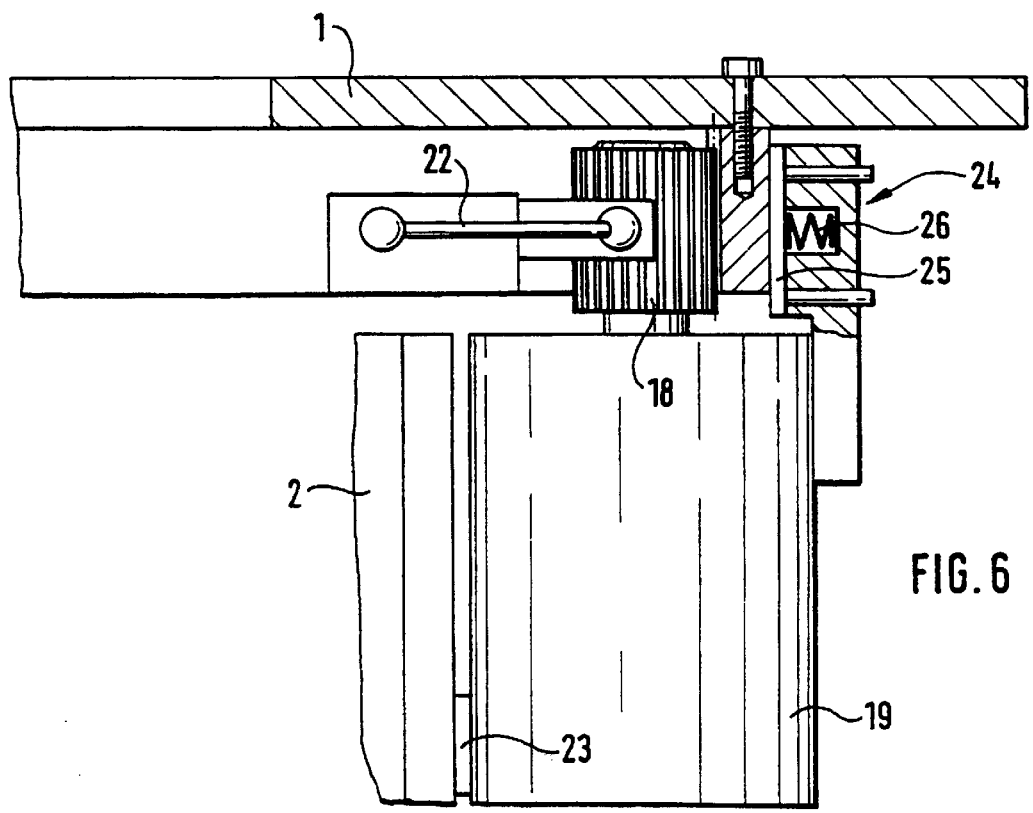

As FIG. 5 shows, it proves expedient to use the inner race of bearing 3 as a sensor measuring ring and, for this purpose, to provide measuring marks on its face on the side facing away from the wheel 5. If required, it is also possible to provide a corresponding marking layer. Arranged opposite this inner-race side, serving as a measuring ring, is/are one or more sensors 27, allowing the respective actual steering position of the wheel to be detected by the sensors due to the rotationally fixed position of the inner race 15 relative to the wheel 5. The sensor or sensors 27 can expediently be assigned corresponding holders on the plate-shaped mounting head, with the result that given appropriate alignment of the mounting head relative to the vehicle body, no further adjustment work is required during assembly and disassembly.

In the above description, it is assumed that the fixing plate belongs to the mounting head 1 and this fixing plate is taken out together with the other parts attached to it as an overall assembly. A simplified solution is to leave the fixing plate on the vehicle and merely release bearings 3 for disassembly since the bracket and the parts attached to it, in particular, for instance, the drive and the motor 19, can be removed with bearing 3 as an assembly.

In the two possible configurations discussed above, i.e. the assembly with the fixing plate and the assembly without the fixing plate, that is an assembly unit formed solely by the bracket and the parts connected to it, the assembly is provided in the area surrounded by bearing 3 with a central aperture, formed by the interior of bearing 3, through which all the connections to the wheel can be passed, including, for example, all the electrical and/or hydraulic connections which are not illustrated specifically here.

In the context of the above explanation of the invention, the drive for the bracket and hence for the rotation of the wheel 5 about the axis 4 as the steering axis has been illustrated and explained in the form of a geared drive. This is of course only by way of example, and it would be equally possible to configure this drive in a conventional slip-free form as a chain drive, rack-and-pinion drive or the like.

With regard to fail safety, which must be ensured in the highest degree when it comes to vehicle steering, it may be expedient within the context of the invention to duplicate the drive elements by providing an additional, independent second motor with a pinion which engages in the toothing of the supporting ring 16 concentric to the axis 4 of rotation. A corresponding safety measure where there is only one drive motor consists in assigning the latter a second winding.

The fact that, within the context of the invention, the rotary drive for the wheel set is assigned as it were to the wheel suspension as an assembly results in an increase in space and overall height within the body. Furthermore, arranging the supporting ring 16 in the manner shown allows for very large supporting-ring diameters and hence very large transmission ratios at the customary drive pinion size, with the result that the associated drive motor for driving the wheel set in rotation can be of relatively low-power configuration and thus operated even with conventional transmission gears.

What is claimed is:

1. Wheel suspension for vehicles, in particular commercial vehicles, comprising:

a mounting head that can be fixed to a floor section of the vehicle, a bracket forming a carrier for a steerable wheel, the bracket being mounted on the mounting head in such a way as to be rotatable about an upright axis, and an actuating motor which is used to rotate the bracket relative to the mounting head, is carried by the bracket and is in engagement, by way of a drive pinion, with a ring gear concentric with the axis of rotation of the bracket and fixed relative to the mounting head, wherein the ring gear, in the form of a supporting ring, forms a fixed support for the actuating motor, wherein a countersupport for the actuating motor rests against the supporting ring on a side opposite the drive pinion, and wherein the actuating motor is connected in an elastically hinged manner to the bracket.

2. Wheel suspension according to claim 1, wherein the supporting ring is internally toothed and the counter support for the actuating motor rests against the outer circumference of the supporting ring.

3. Wheel suspension according to claim 2, wherein the countersupport is connected to the actuating motor in an elastically flexible manner.

4. Wheel suspension according to claim 3, wherein the actuating motor is arranged vertically on the bracket, carries the drive pinion in the upper end region and is connected to the bracket by struts that are at an angle to one another and, with the bracket as a base, form a supporting triangle in plan view.

5. Wheel suspension according to claim 2, wherein the supporting ring is attached to the mounting head.

6. Wheel suspension according to claim 5, wherein the actuating motor is arranged vertically on the bracket, carries the drive pinion in the upper end region and is connected to the bracket by struts that are at an angle to one another and, with the bracket as a base, form a supporting triangle in plan view.

7. Wheel suspension according to claim 2, wherein the actuating motor is arranged vertically on the bracket, carries the drive pinion in the upper end region and is connected to the bracket by struts that are at an angle to one another and, with the bracket as a base, form a supporting triangle in plan view.

8. Wheel suspension according to claim 7, wherein the struts are connected elastically to at least one of the actuating motor and the bracket.

9. Wheel suspension according to claim 7, wherein the actuating motor has an elastic support relative to the bracket in the lower region remote from the pinion.

10. Wheel suspension according to claim 1, wherein the countersupport is connected to the actuating motor in an elastically flexible manner.

11. Wheel suspension according to claim 10, wherein the supporting ring is attached to the mounting head.

12. Wheel suspension according to claim 11, wherein the actuating motor is arranged vertically on the bracket, carries the drive pinion in the upper end region and is connected to the bracket by struts that are at an angle to one another and, with the bracket as a base, form a supporting triangle in plan view.

13. Wheel suspension according to claim 10, wherein the actuating motor is arranged vertically on the bracket, carries the drive pinion in the upper end region and is connected to the bracket by struts that are at an angle to one another and, with the bracket as a base, form a supporting triangle in plan view.

14. Wheel suspension according to claim 13, wherein the struts are connected elastically to at least one of the actuating motor and the bracket.

15. Wheel suspension according to claim 13, wherein the actuating motor has an elastic support relative to the bracket in the lower region remote from the pinion.

16. Wheel suspension according to claim 1, wherein the supporting ring is attached to the mounting head.

17. Wheel suspension according to claim 16, wherein the actuating motor is arranged vertically on the bracket, carries the drive pinion in the upper end region and is connected to the bracket by struts that are at an angle to one another and, with the bracket as a base, form a supporting triangle in plan view.

18. Wheel suspension according to claim 1, wherein the actuating motor is arranged vertically on the bracket, carries the drive pinion in the upper end region and is connected to the bracket by struts that are at an angle to one another and, with the bracket as a base, form a supporting triangle in plan view.

19. Wheel suspension according to claim 18, wherein the struts are connected elastically to at least one of the actuating motor and the bracket.

20. Wheel suspension according to claim 18, wherein the actuating motor has an elastic support relative to the bracket in the lower region remote from the pinion.

\* \* \* \* \*